April 10, 1928.
G. P. PHILLIPS
1,666,021
ARTICULATOR
Filed Jan. 2, 1925
3 Sheets-Sheet 2
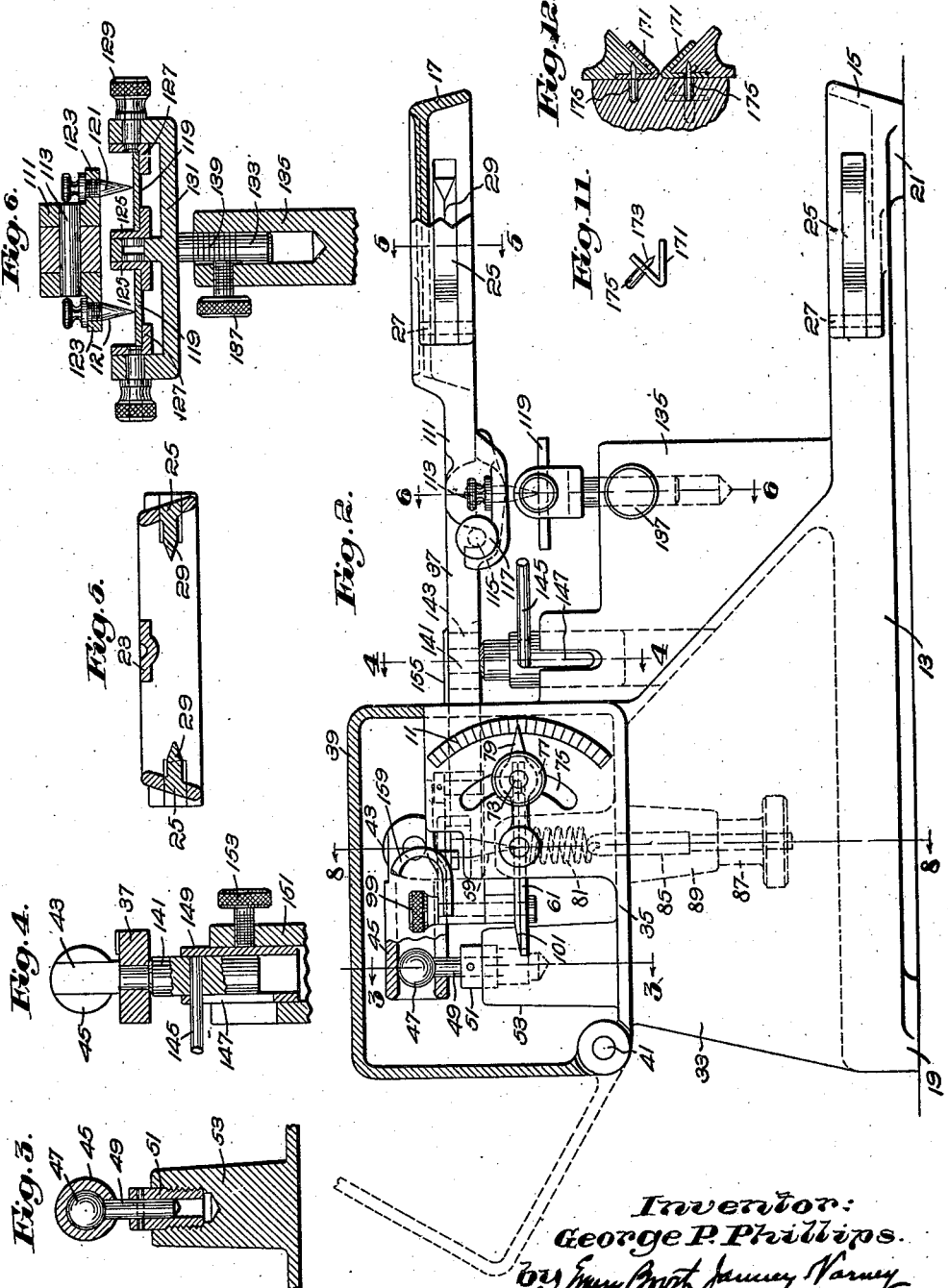
Inventor:
George P. Phillips.

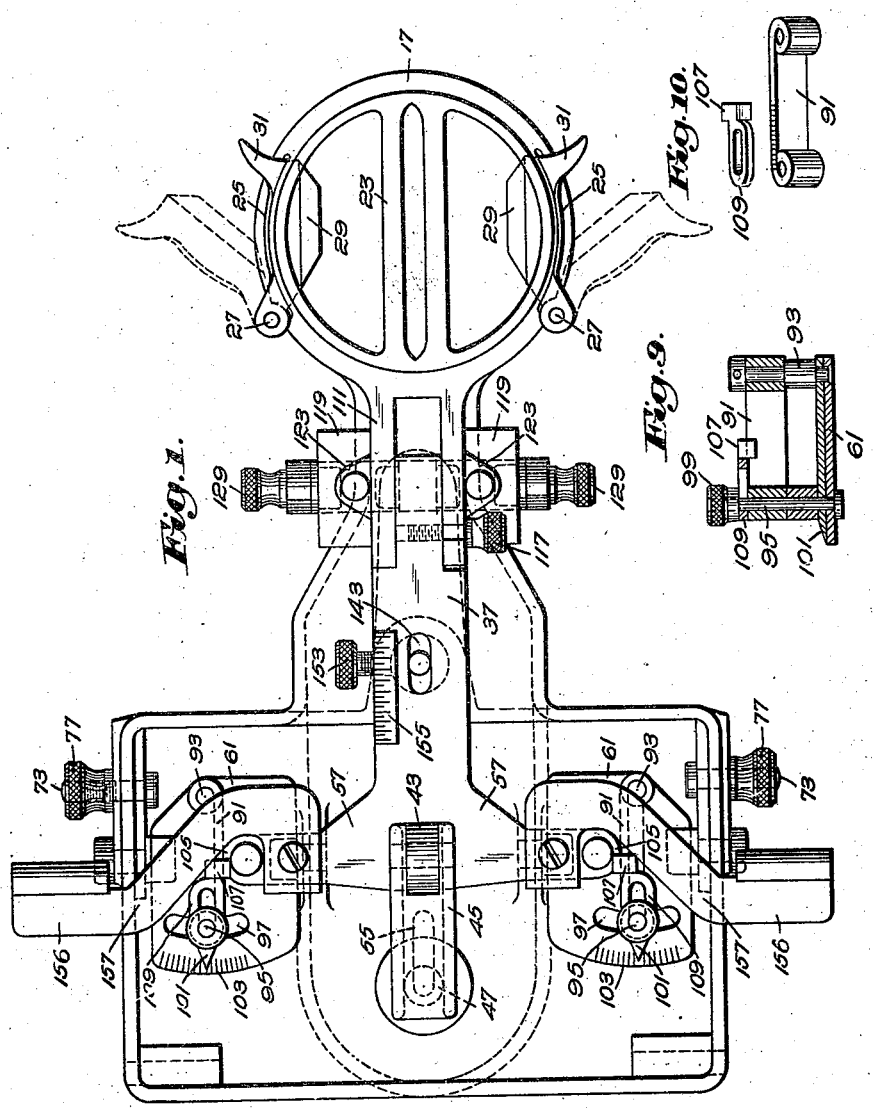

April 10, 1928.   1,666,021
G. P. PHILLIPS
ARTICULATOR
Filed Jan. 2, 1925   3 Sheets-Sheet 3

Inventor:
George P. Phillips.

Patented Apr. 10, 1928.

1,666,021

UNITED STATES PATENT OFFICE.

GEORGE P. PHILLIPS, OF BOSTON, MASSACHUSETTS.

ARTICULATOR.

Application filed January 2, 1925. Serial No. 6.

This invention relates to articulators utilized for making artificial dentures and consists in improvements which provide a mechanically simple apparatus so constructed as to permit ready adjustment for the accurate reproduction of the natural movements of the jaws of a patient.

The invention will be best understood by reference to the following description when taken in connection with the accompanying illustration of one specific embodiment thereof, while its scope will be more particularly pointed out in the appended claims.

In the drawings,—

Fig. 1 is a plan view of an articulator embodying one form of the invention;

Fig. 2 is a side elevation in partial section showing the apparatus illustrated in Fig. 1;

Fig. 3 is a sectional elevation on the line 3—3 in Fig. 2 taken through the swivel post connection for the upper holding arm or jaw;

Fig. 4 is a similar sectional elevation on the line 4—4 in Fig. 2 taken through the holding pin and bushing for the upper jaw;

Fig. 5 is a transverse sectional elevation taken on the line 5—5 through the upper model holder;

Fig. 6 is a sectional transverse elevation taken on the line 6—6 in Fig. 2 showing the front or accessory condyle supports;

Fig. 9 is a detail in sectional side elevation showing the relation of the upper model holding arm to the side guiding plate and its limiting stop;

Fig. 10 shows in perspective the side guide plate and limiting stop;

Fig. 11 shows an adjustment for a trial plate utilized in producing a guide mold for accurately and readily adjusting the articulator; and Fig. 12 shows a method of forming the guide mold while utilizing such plate.

Figure 7:
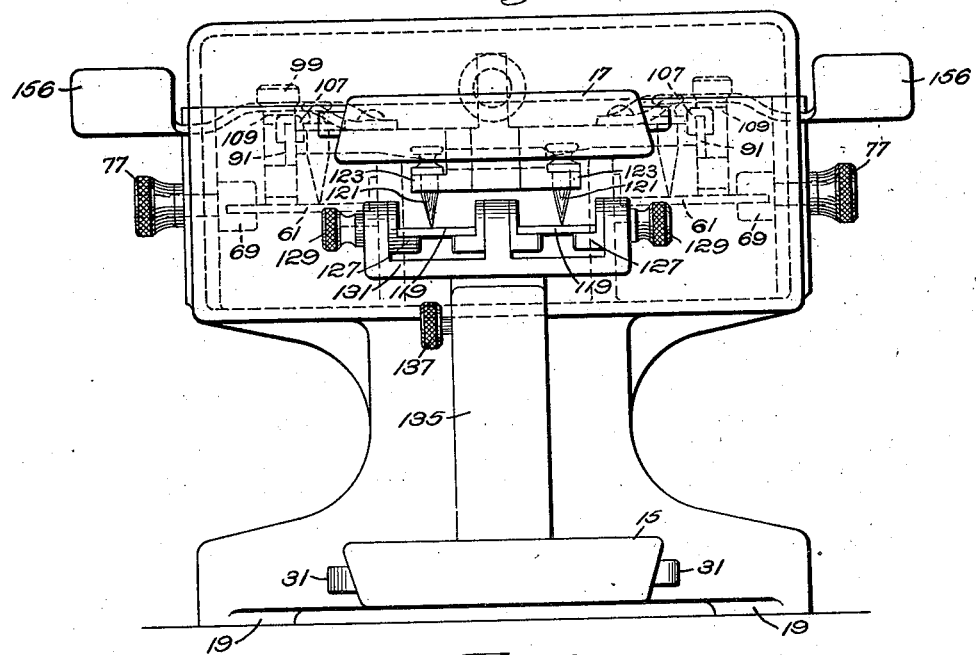
Fig. 7 is a front elevation of the articulator shown in Fig. 1.

Refering to the drawings and to the illustrative embodiment of the invention, the articulator is provided with a base or rest 13 by which the apparatus may be placed on any suitable support, the base being prolonged at the front to serve as a fixed arm or jaw for holding the lower jaw model. The end of the prolongation for this purpose is provided with a model holder 15, this being directly under and confronting a similar model holder 17 which is adapted to hold the upper jaw model. When the apparatus is in use it rests upon a pair of supporting feet 19 at the rear and on the single foot 21 at the bottom of the model holder 15. Relative movement between the two model holders is had by appropriately guided movements of the upper or movable model holder 17, as will be later described.

Each model holder 15 and 17 consists of a dish-shaped casing, preferably with flaring sides, in which the plaster base of the model is inserted. The bottom of each receptacle is provided with a transverse plate or bar 23 (see Figs. 1 and 5), but is otherwise open and has at each opposite side a segmental section 25 hinged at 27 and provided with inturned projecting beveled walls 29 which project into the space within the dish-shaped receptacle.

When the models are prepared and transferred to the articulator, the holders 15 and 17 are each filled with a base of soft plaster of Paris and the upper and lower jaw models placed in their respective base in central occlusion corresponding with the median line of the model holders. The plaster is then trimmed off the backs and sides of the holders and allowed to harden. After the plaster has set the hinged segments 25 act as keys holding each plaster base in its initially located position. At any time it is desired to remove the base, however, each key 25 may be swung outwardly to the dotted line position (Fig. 1) and by means of the thumb piece 31 and the base and its model readily removed from the holder. The same base may be replaced at any time in the model holder in its original identical relation to the holder and can there be locked in position by means of the hinged keys 25, the latter serving not only to hold the base in position but to insure its relocation in its original position. By this arrangement the same apparatus, without the necessity of duplicate holders or parts, may be used interchangeably with any number of sets or models, and the same set may be separately removed from or installed in the articulator with the assurance of reproducing at will the same relationship.

The base 13 is provided at its opposite end with a pedestal or raised portion 33 which supports a box-like casing 35 within which are provided the adjustments and connections for accurately guiding the movements of the upper jaw-carrying arm 37. This casing is provided with a cover 39 which is hinged at 41 so that it may be thrown back at will to permit manipulation and inspection of the necessary adjustments.

It is desirable that the movable model holding arm 37 should be provided with a floating connection to the body piece 13 permitting of a universal movement of the arm with relation to the base. For this purpose the arm is provided at its rear end with an upright lug 43 through which it has hinged adjustment about a horizontal axis to the forked or slotted end of a sleeve 45. The sleeve serves as a housing for the ball swivel 47 (Figs. 1, 2 and 3), which latter is carried on the upright post 49 secured to the sleeve 51, the latter threaded into the post 53 presented by the casing 35. The post 49 passes through a longitudinal slot 55 (Fig. 1) in the bottom of the sleeve which is of sufficient extent to permit a limited longitudinal movement of the sleeve and the arm 37 hinged thereto.

This provides a floating connection for the movable model holding arm which does not conflict with but permits all possible movements of the arm and the guidance of the various adjustments which are here described. This provides for a rocking movement of the arm about a longitudinal axis as well as a lateral movement about an upright axis and an opening and closing movement about a horizontal transverse axis. Each of these movements may take place individually or simultaneously each with another or the others, and may take place in any one of the various positions which the swivel housing may occupy on the ball attachment and which it may assume as an incident to protrusive or longitudinal movements of the model holding arm with relation to the ball.

Figure 8:
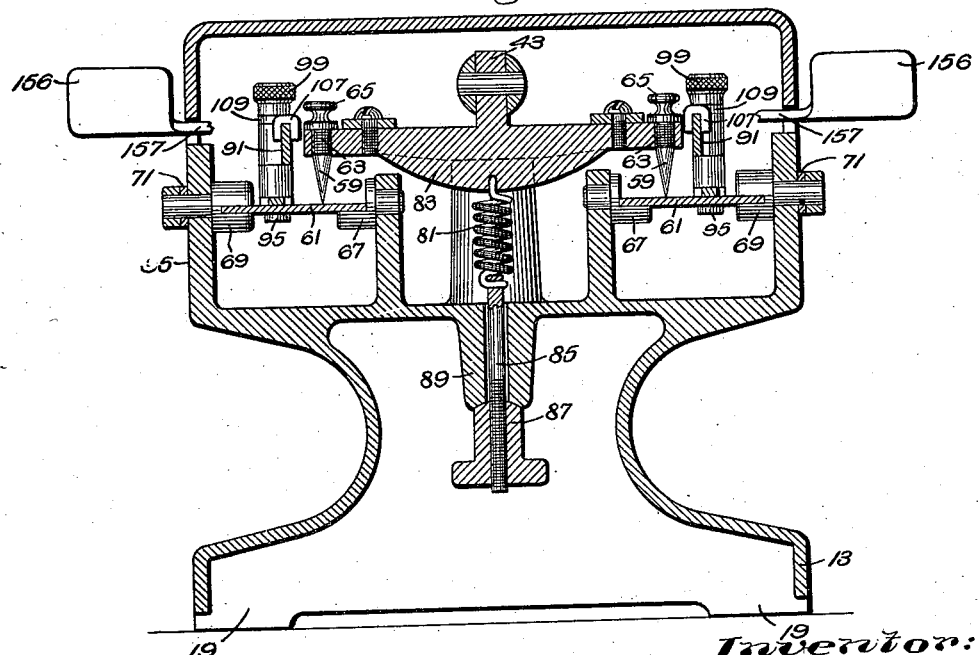
Fig. 8 is a transverse sectional elevation of the apparatus taken on the line 8—8 in Fig. 2.

For the guidance of the arm 37, the latter is provided at its rear end with two opposite lateral extensions 57, provided each with downwardly extending supporting pins 59, each of which rests upon an adjustable guide plate 61 (Fig. 8, also Figs. 1, 2 and 7). These pins supply the function of the condyles and the guides those of the condyle paths. The parts which guide opposite sides of the arm 37, while independently adjustable, are substantially identical in construction and those on one side only need be specifically described.

Each condyle supporting pin 59 is provided with a threaded shank 63 and a thumb nut 65, so that it may be screwed down tight into the arm 57 or partly unscrewed therefrom raising it away from the plate. The plate 61 is carried in opposite trunnions 67 and 69 which are journaled in the walls of the casing 35 so that the plate may be adjustably rocked about a transverse axis. The outer trunnion 69 has secured thereto at the outside of the casing an adjusting arm 71 (Figs. 1, 2 and 8), the opposite end of which is provided with a clamping screw 73 passing through an arc-shaped slot 75 in the casing and engaged by the clamp nut 77. By means of the arm and clamp nut the condyle guide plate 61 may be tipped at any required angle and the adjustment noted by means of an indicating pointer 79 which cooperates with a series of graduations 81 on the face of the casing. This permits the plates to be reset at any future time to reproduce the adjustment to which the instrument may be set, the scale readings having been noted at the time.

It will be seen that in the neutral position of the arm 37, or that corresponding to a position of central occlusion, the points of support of the condyle pins on the condyle guide plates coincides with the axis on which the plates are adjusted. Accordingly, no matter what the adjustment of the plates may be, the arm can always be brought back to the same neutral point or position of central occlusion.

During the use of the apparatus the condyle supporting pins are caused to engage with the condyle plates by means of a tension spring 81 which is secured to a lug 83 on the underside of the arm 37 (see Fig. 8), the lower end of the spring being fastened to the tension spring bar 85, which latter can be tightened and adjusted by means of the thumb nut 87 engaging the threaded end of the bar and seated in a concave end of a depending lug 89 in the bottom of the casing. The spring 81 exerts its tension in the same transverse plane in which the condyle guide pins and the axis of the condyle plates are located, so that it exerts a restoring action tending normally to bring the model holding arm when released back to a neutral position.

To guide the jaw arm in producing the irregular movements which are to similate the natural movements of the jaws of the patient, the arm should be guided laterally simultaneously with the guidance afforded by the condyle plate 61. For this purpose there is provided on each condyle plate a vertical or side guiding plate 91 (Figs. 1, 8, 9 and 10) which is swiveled on an upright stud 93 mounted near the forward edge of the plate 61, the opposite end of the guide plate 91 having secured thereto the headed clamping screw or stud 95 which passes through an arc-shaped slot 97 near the rear edge of the condyle plate and is provided with the clamp nut 99 by means of which it can be clamped in a variety of angular positions. The clamp screw carries an indicator 101 which registers with a series of graduations 103 so that its angular adjustment can be noted and recorded as desired.

The side of the guide plate 91 is cooperatively related to the extension 57 of the arm 37 so that it may have contact with a cam shaped tip 105 of the arm (Fig. 1). The tip 105 is notched as indicated in Fig. 1 and adapted to be engaged by a stop plate 107 (Figs. 1, 9 and 10). The latter consists of a U-shaped piece (see Figs. 8, 9 and 10) resting on the upper edge of the guide plate 91 and is provided with a slotted extension 109 which underlies the clamp nut 99, and through the slot of which passes the clamp screw 95.

When the instrument is ready to be adjusted the clamp nut 99 is loosened, the plate 91 swung outwardly, and the stop pin 107 is moved toward the end of the plate. The extreme position of the arm (either right or left, as the case may be) being then determined from the models in the model holders, the plate 91 is moved up to contact with the tip 105 while the arm is in its extreme position and the stop plate moved back to engage the notch or shoulder in the tip (as indicated in Fig. 1), the thumb nut being then tightened to hold the guide plate and stop plate in the position which this adjustment determines.

To afford accessibility to the jaw models during the process of arranging the teeth, the arm 37 is preferably jointed between the model holder and the main condyle supports, there being provided for this purpose the forward branch or section 111 of the arm which is directly attached to the model receptacle at 17, the arm being forked and hinged at 113 to the reduced forward end of the arm 37. One branch of the forked arm extends back and beneath a stop pin 115 (Figs. 1 and 2) which is carried by the arm 37, so that when the model holder 17 is depressed the arm 37 and its hinged branch 111 act as a rigid unit. On the other hand, the model holding arm 111 may be swung upward about its pivot 113 at will.

It is desirable at times to lock the hinged arm 111 rigidly to the arm 37, as, for example, where it is desired to grind the teeth with emery or other abrasive by moving the upper model back and forth over the lower model. For this purpose the stop pin 115 is in the form of a threaded stud and provided with the thumb piece 117, so that, by setting the latter up tightly, the two arms may be locked rigidly together. When the thumb piece is slightly loosened the forward arm is capable of being swung up relative to the main arm 37, as described.

Since the wax models at ordinary room temperature have a measure or softness and yieldability, the user of an apparatus of this type, by inserting undue downward pressure against the upper model, may unconsciously and unintentionally compress the molds. To prevent this and to provide that there will always be maintained the same vertical relation between the models which the proper adjustment of the instrument is intended to assign for all positions of the model-carrying arm, I have provided auxiliary or supplemental guidance for the arm in addition to that provided by the condyle guide plate 61. Such auxiliary guidance is herein afforded by the front or accessory condyle guide plates 119 (Figs. 1, 2 and 6) which are located beneath the rear end of the arm branch 111, one on either side thereof. These support the arm through the auxiliary condyle pins 121 which are similar in construction to the pins 59 and are threaded into the side flanges 123 of the arm 111. The plates 119 are similar in construction, being each carried by the inside trunnion 125 and the outside trunnion 127, the latter having an outwardly threaded end which is engaged by the clamp piece 129 by which it may be set up in any desired position of adjustment. The plate 119 can thus be rocked about a transverse axis, the latter coinciding with the points of support of the condyle pins 121 when the latter are resting against the plates. The trunnions 125 and 127 are supported by the bracket 131, the latter carried by the stud 133 vertically adjustable in the part 135 of the frame. A clamping nut 137 is utilized to lock the stud in any assigned position of adjustment, the stud being preferably provided with graduations 139 by which its exact position can always be noted.

To permit the arm to be brought to a point of neutral position or a position of central occlusion, there is provided a shouldered centering pin 141 (Figs. 1, 2 and 4), which latter at will may be raised to the position indicated in Fig. 2 where the reduced end thereof enters a slot 143 (Fig. 1) in the arm, leaving the latter in neutral position on the shoulder of the pin. After the models have been located in the holders this pin is dropped down out of engagement with the arm, so that the latter is free to execute its required movements. For this purpose the centering pin 141 is provided with a lateral adjusting pin 145 extending through a bayonet joint slot 147 in the sleeve 149, the latter being held in the enlargement 151 of the base 13 (see Fig. 4). When the pin 145 is lifted and turned into the horizontal portion of the slot seen in Fig. 2, it enters the slot 143 in the arm and locates the latter in a fixed and neutral position. By turning the pin 145 and dropping it into the vertical portion of the slot 147 the centering pin is dropped out of contact with the arm, allowing the latter to execute its movements unimpeded by the centering pin.

The bushing 149 is vertically adjustable in the frame part 151 and can be held at any required position by the clamp screw 153. This permits the model holder to be vertically adjusted to accommodate models of different size and for lengthening and shortening the bite. The slot 143 of the arm 37 is slightly elongated to allow this vertical adjustment of the pin and its bushing.

The arm 37 is preferably provided with graduations, as at 155, which may register with the front wall of the casing so that the extreme protrusive movement of the arm may be noted and recorded if desired.

To assist in moving the model carrying arm, the latter may be provided with any convenient devices which can be grasped by the hand of the user. In the illustrative embodiment of the invention I have shown for this purpose projecting plates or wings 157 secured one to each opposite lateral extension 57 of the arm 37. Such wings project through the side of the casing and terminate in thumb or grasping pieces 159 of convenient size and shape to be manually engaged in moving the arm.

In installing the models in this device the centering pin 141 is lifted to place the arm in a position of central occlusion, the cover 39 of the casing being swung back to permit access to the parts within. The joint between the two branches 37 and 111 of the arm is locked by tightening the thumb nut 117. The model holding receptacles are then filled with plaster and the models are set therein, the upper and lower models being placed in their respective places in a position of central occlusion corresponding to the median line of the model holders. The excess plaster having been removed and the bases allowed to harden, the centering pin is dropped to free the arm. The spring tension exerted through the spring 81 on the arm 37 is also freed by relieving the tension-spring nut 87. The lateral guide plates 91 are moved back out of contact with the tips 105 of the arm and the condyle pin supports 59 and 121 are unscrewed to free them from any contact with the condyle guide plates. The apparatus is then ready for adjustment.

With the aid of suitable molds the relative position of the models for extreme lateral bite in one direction or the other is then determined. Both condyle pins on the side of the instrument for which the bite has been adjusted are then screwed down and their condyle plates,—both the main plate 61 and the auxiliary plate 119,—tipped by adjustment to bring the surfaces in supporting contact with the tips of their respective pins. The plates are then set in this position of adjustment. With the arm still in the extreme position thus determined, the vertical guide plate 91 is then moved until it contacts with the tip 105 and the stop plate 107 is moved back to engage the notched tip and the thumb nut 99 tightened to lock these parts in position.

The model arm is then moved to the opposite extreme position as determined by the lateral bite in the opposite direction, and corresponding adjustment made of the condyle guide plates, the vertical guide plate 91 and the stop 107 on the opposite side of the arm. The spring tension is then restored by tightening the tension 87 and the cover turned down which leaves the instrument ready for use with the models installed.

When a patient moves his lower jaw from a position of central occlusion to extreme right or left the jaw undergoes all movements used in chewing. This movement is a complex movement compounded of progressive lateral and forward movements with up and down or bitting movements or those in which the lower jaw normally approaches the upper jaw but sometimes recedes therefrom. These movements differ markedly in different patients and also commonly differ in the same patient for the right and left bite. In an articulator it is desirable to provide independently adjustable guidance for these movements in the extreme positions at opposite sides of the jaw, so that the instrument may be adjusted and the right bite accurately reproduced in all three directions and without interference by the guiding devices which control the left bite. Similarly, the movements in making the left bite should be carried out without interference from the guiding devices controlling the right bite.

These conditions are provided for in the above described instrument, since the adjustment of the condyle plates, coupled with that of the side guiding plates and the stop pins, together with the floating connection which permits forward and backward movement of the jaw holder, causes the latter in its extreme right or left bite to be accurately guided in a progressively changing path with a compound lateral, forward and up and down or biting movement up to the limiting point provided for by the stop piece. Furthermore, the guidance for the model carrying arm in its lateral bite at either side is controlled exclusively by the guiding devices provided for that side of the articulator uninterfered with by the guiding devices provided for the opposite side thereof. The lateral movement for any given side is determined by the plate 91 and stop 105 for that particular side, the biting movement by the plates 61 (and 119) and the forward movement by the relative adjustment of the plates 91 and 61.

The provision of the scale readings on this instrument not only permits the repeated resetting of the instrument to the same point, but permits a record to be made of the exact condition in the mouth of the patient, an examination of which record assists in making a diagnosis of the case and in determining the proper remedy.

Relative movement only between the model holders is required. It will be observed that the lower model holder 15 in which is placed the model taken from the lower movable jaw of the patient is fixed like the natural upper jaw, while the upper model holder 17 in which is placed the model taken from the upper fixed jaw of the patient is movable like the lower natural jaw. Accordingly the relation of the models in the articulator as regards actual movement becomes the reverse of the relation of the jaws of the patient; that is to say, the protrusive movement of the lower jaw model is reproduced by a backward movement of the model holding arm 17 instead of a forward movement, as in the case of the natural jaw, and a right lateral movement in the model holding arm corresponds to a left lateral movement in the case of the natural jaw.

For the purpose of accurately adjusting the instrument to accord with the lateral bites, I have provided an improved device for taking the relations in the mouth and an improved method of measuring the same. For this purpose I utilize a device such, for example, as the clip 171 shown in Fig. 11, which can be applied to the trial plate and utilized while the latter is in the mouth of the patient for forming a guide mold, which in turn can be made to determine the adjustment of the articulator.

These clips are preferably formed of some non-corrosive metal and have a V-shaped cross section and conform in contour generally to that portion of the edge of the trial plate to which they are applied. Each clip has one or more inturned points 173 which may be pressed into the waxy material of the plate, so that the slip is attached to the occlusial rim of the trial plate, as indicated in Fig. 12. Each clip is also provided with one or more outwardly extending projections 175 having rounded ends. One such clip is attached to each opposite side of the trial plate to gage the relations of the respective lateral bites. Similar clips are applied to contiguous portions of the lower trial plate, so that when the plates are placed in the mouth of the patient adjacent upper and lower clips bear the normal relation indicated in full lines in Fig. 12. Molds of molding compound are then made in the usual manner and applied to each set of clips while the patient holds the jaws in the desired positions for the opposite lateral bites. One such mold is indicated in Fig. 12, the dotted lines indicating the position in which the lower plate is moved in determining the bite. The pins on the clip act to provide more or less complex formations in the mold so that when the trial plates with the clips attached are placed in the articulator the molds can be used as a guide to quickly bring the plates in the required positions for extreme lateral adjustments of the articulator, the projections 175 acting like dowel pins to bring the models and plates to the precise arrangement assumed in the mouth when making the opposite lateral bites. Since the edge of the clip 171 coincides with the upper edge of the plate, the two plates can move relatively to each other without interference and with perfect freedom.

While I have herein shown and described for the purpose of illustration one specific embodiment of the invention it is to be understood that the same is not limited to the mechanical details and to the form and relative arrangement of parts herein shown, but that extensive deviations may be made therefrom without departing from the spirit of the invention.

I claim—

1. A dental articulator comprising a fixed lower model holder, a model holding arm cooperatively and movably related thereto and located above the fixed holder, a connection permitting free movement of the arm and providing longitudinal, lateral and vertical movements of the upper model holder relatively to the lower holder, the same comprising a ball and socket joint permitting longitudinal movement of the arm and a hinged connection of the arm thereto about a horizontal axis, and a set of guiding devices for each opposite side of the arm independently adjustable for guiding the arm in its longitudinal, lateral and vertical movements and serving to control the arm, each independently of the other in respect to its extreme right and left movements.

2. A dental articulator comprising a model holder, an arm for a second model holder cooperatively and movably related thereto, a connection permitting free movement of the arm and providing for longitudinal, lateral and vertical movements of the model relatively to its mate, and sets of guiding devices for each opposite side of the arm independently adjustable for guiding the latter in its longitudinal, lateral and vertical movements and controlling the arm each independently of the other in its respective extreme right and left movements, the same comprising a condyle guide adjustable about a transverse axis, a condyle support engaging therewith, a lateral guide member adjustable about a vertical axis and adapted to be engaged by a part on the arm, and an adjustable stop member to limit the lateral movement of the arm.

3. A dental articulator comprising a model holder, an arm for a second model holder cooperatively and movably related thereto, a connection which permits the free movement of the arm and provides for longitudinal, lateral and vertical movements of the model relatively to its mate, sets of adjustable devices for each opposite side of the arm for guiding it in its longitudinal, lateral and vertical movements, the same including each an adjustable condyle guide and a support engaging therewith, and an adjustable supplemental guide and support to additionally define the inclination to the horizontal plane assumed by the arm in its longitudinal movements.

4. A dental articulator having a movable model-holding arm and a plurality of adjustable guiding devices at each side of the arm to provide plural points of support lengthwise the arm while controlling the movement thereof.

5. A dental articulator having a movable model-holding arm, a condyle guide plate adjustable about a transverse axis to guide the arm in its movement, and a supplemental adjustable plate similarly adjustable about a transverse axis at another point lengthwise the arm.

6. A dental articulator having a movable model carrying arm and support, adjustable guiding devices for guiding the arm in its opposite lateral movements, and a centering device on said support for holding the arm in its neutral position of central occlusion, said device being normally disengaged from said arm.

7. A dental articulator having a movable model-carrying arm, adjustable guiding devices for guiding the arm in its extreme right and left movements, and a centering device to hold the arm in its neutral position of central occlusion, the latter comprising an upright pin engaging a longitudinal recess in the arm.

8. A dental articulator having a movable model-carrying arm, adjustable guiding devices for guiding the arm in its extreme right and left movements, and a centering device to hold the arm in its neutral position of central occlusion, the same comprising an upright member adapted to engage with the arm and a mounting in which the member may be withdrawn from the arm to release the same, said mounting being vertically adjustable for lengthening or shortening the bite.

9. In a dental articulator, the combination with a support, of a movable model carrying arm with means for adjustably defining the lateral movements of the arm including an adjustable condyle guide at each side of the adjustable condyle guide at each side of the arm to define the inclination to the horizontal plane taken by the arm in its longitudinal movements, and supplemental guiding means also defining the inclination to the horizontal plane assumed by the arm in its longitudinal movements and providing a support for the arm in a different position lengthwise the same.

10. In a dental articulator, the combination with a support, of a model carrying arm connected to said support for mandibular movement thereon, lateral extensions carried by said arm near its point of connection to said support and having guide bearing members, and means for adjustably defining the lateral movements of the arm, including a guide at each side thereof adjustable about a horizontal axis and cooperatively related to said bearing members to define the inclination to the horizontal plane taken by the arm in such movements, and a supplemental guide nearer the free end of the arm to assist in guiding the arm in its said movements, the same comprising a guide plate having a substantially flat bearing surface, ears on said support between which said plate is pivoted on a horizontal axis transverse to the arm, and a bearing member depending from the arm and engaging said plate.

11. In a dental articulator, the combination with a support, of a model carrying arm mounted for free mandibular movement thereon, means for adjustably defining the inclination to the horizontal plane taken by the arm in its movements, including a guide at each side thereof adjustable about a horizontal axis and a supplemental guide for said movements located at a different position lengthwise the arm and comprising a guide plate carried by the support and adjustable about a horizontal axis transverse the arm, and a bearing member carried by the arm and engaging said plate.

12. A dental articulator having a movable model holding arm and a plurality of adjustable guiding devices at each opposite side of the arm for defining the inclination to the horizontal plane assumed by the arm in its longitudinal, manibular movements.

In testimony whereof, I have signed my name to this specification.

GEORGE P. PHILLIPS.